(12) United States Patent  
Tsunemi et al.

(10) Patent No.: US 8,005,830 B2  
(45) Date of Patent: Aug. 23, 2011

(54) SIMILAR FILES MANAGEMENT APPARATUS AND METHOD AND PROGRAM THEREFOR

(75) Inventors: Yasuaki Tsunemi, Tokyo (JP); Takehiro Yamamoto, Tokyo (JP)

(73) Assignee: NEC Corporation, Minato-ku, Tokyo (JP)

(*) Notice: Subject to any disclaimer, the term of this patent is extended or adjusted under 35 U.S.C. 154(b) by 542 days.

(21) Appl. No.: 12/078,729

(22) Filed: Apr. 3, 2008

(65) Prior Publication Data

US 2008/0249977 A1 Oct. 9, 2008

(30) Foreign Application Priority Data

Apr. 4, 2007 (JP) ................................. 2007-098386

(51) Int. Cl.
*G06F 17/30* (2006.01)
(52) U.S. Cl. .......................... 707/730; 707/749; 709/204
(58) Field of Classification Search .................. 707/737, 707/739, 740, 747, 752, 730; 709/204
See application file for complete search history.

(56) References Cited

U.S. PATENT DOCUMENTS

| | | | |
|---|---|---|---|
| 5,465,353 A * | 11/1995 | Hull et al. | 1/1 |
| 7,565,348 B1 * | 7/2009 | Waldin et al. | 1/1 |
| 2004/0172394 A1 * | 9/2004 | Smolsky | 707/6 |
| 2005/0188032 A1 | 8/2005 | Yamazaki et al. | |
| 2008/0097972 A1 * | 4/2008 | Gordon | 707/3 |
| 2008/0168135 A1 * | 7/2008 | Redlich et al. | 709/204 |
| 2008/0228811 A1 * | 9/2008 | Drews et al. | 707/102 |

FOREIGN PATENT DOCUMENTS

| | | |
|---|---|---|
| JP | 4-324540 | 11/1992 |
| JP | 6-348760 | 12/1994 |
| JP | 8-58176 | 3/1996 |
| JP | 2000-123041 | 4/2000 |
| JP | 2000-357115 | 12/2000 |
| JP | 2002-63381 | 2/2002 |
| JP | 2002-99454 | 4/2002 |
| JP | 2003-186714 | 7/2003 |
| JP | 2005-202590 | 7/2005 |
| JP | 2006-31181 | 2/2006 |
| JP | 2006-164152 | 6/2006 |
| JP | 2006-185167 | 7/2006 |
| JP | 2006-268447 | 10/2006 |

OTHER PUBLICATIONS

Japanese Office Actions dated Nov. 28, 2008 and Jul. 7, 2009 and partial English translations thereof.

* cited by examiner

*Primary Examiner* — John R. Cottingham
*Assistant Examiner* — Sherief Badawi
(74) *Attorney, Agent, or Firm* — McGinn IP Law Group, PLLC

(57) ABSTRACT

A similar files management apparatus displays files similar to a specified file with the respective degrees of similarity. The similar files management apparatus includes a unit specific information generation means for acquiring information specific to each unit contained in a file by means of a predetermined computation formula from the contents of the unit, a file similarity degree computation means for computing the similarity degree between files by comparing the pieces of information specific to the respective units on a unit by unit basis and a display means for displaying the similarity degree of each file other than a specified file relative to the specified file and file identification information of the each file. The information specific to each unit may be a hash value, a sum check value or a CRC value. The units may be pages, chapters, sections or paragraphs.

5 Claims, 8 Drawing Sheets

FIG.2

| DOCUMENT ID |
|---|
| UPDATED DATE |
| UPDATER ID |
| REPRESENTATIVE VALUE INFORMATION (HASH VALUE, CHECK SUM OR THE LIKE OF EACH PAGE) |
| SAVING LOCATION |

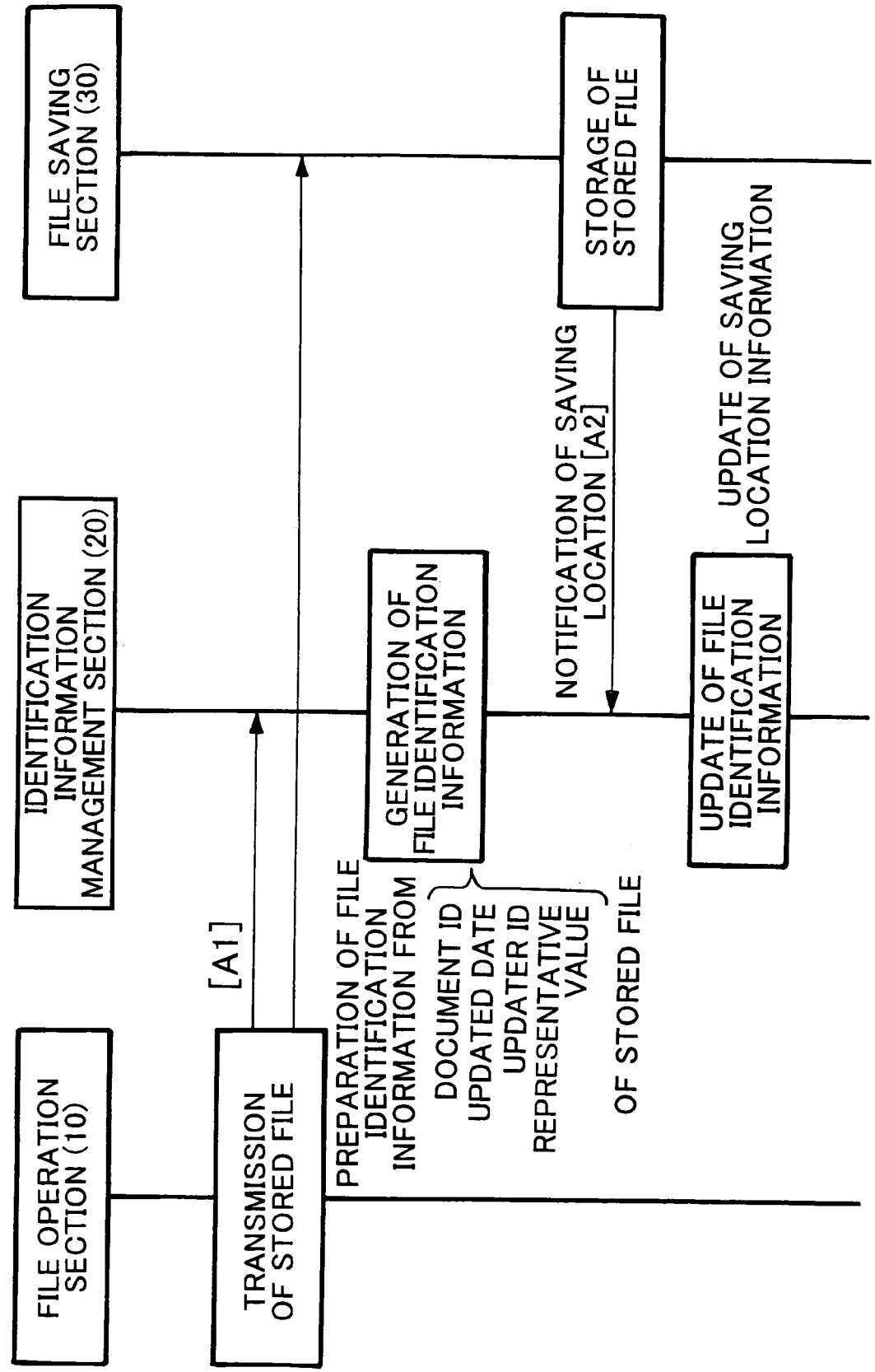

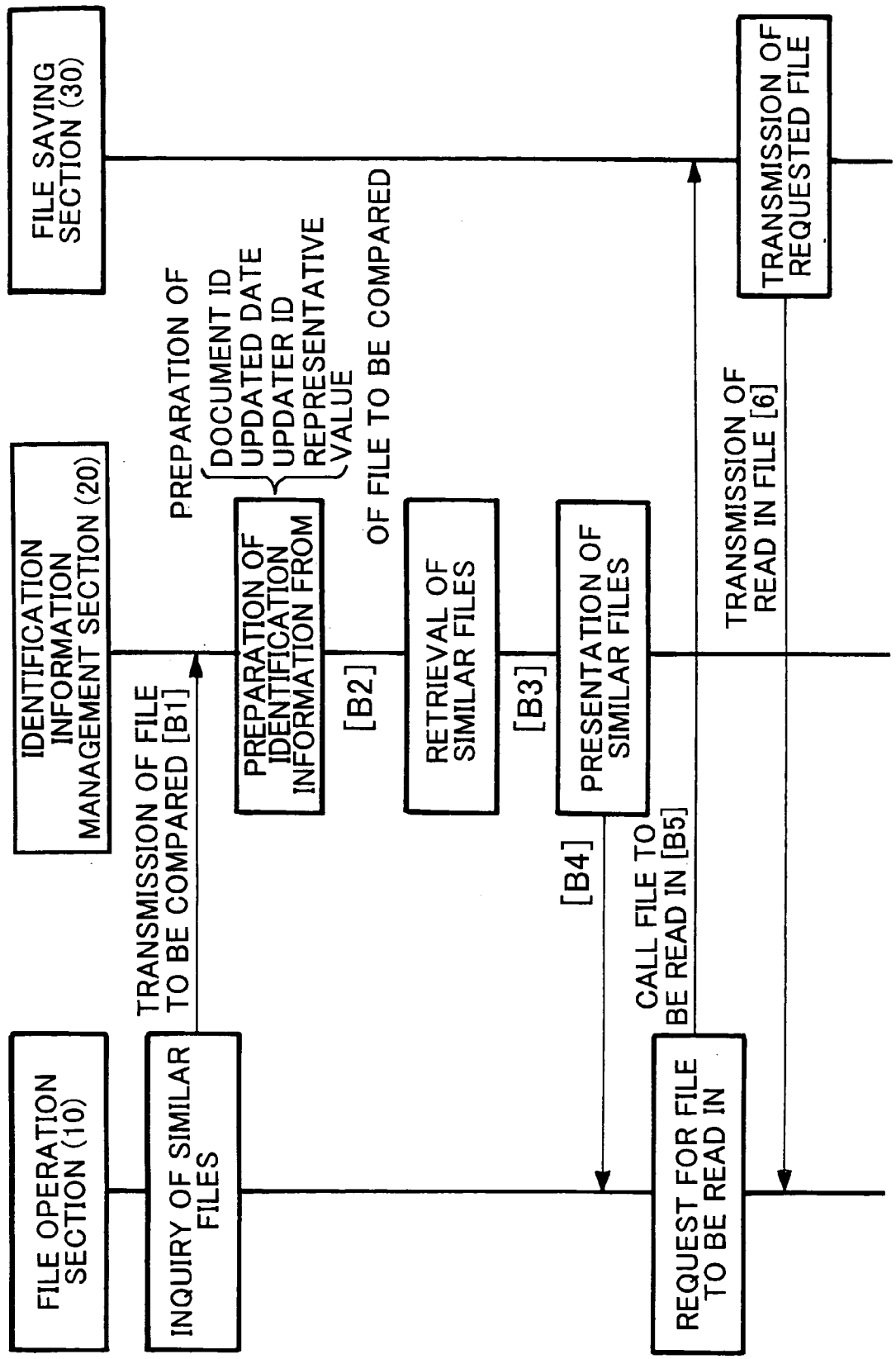

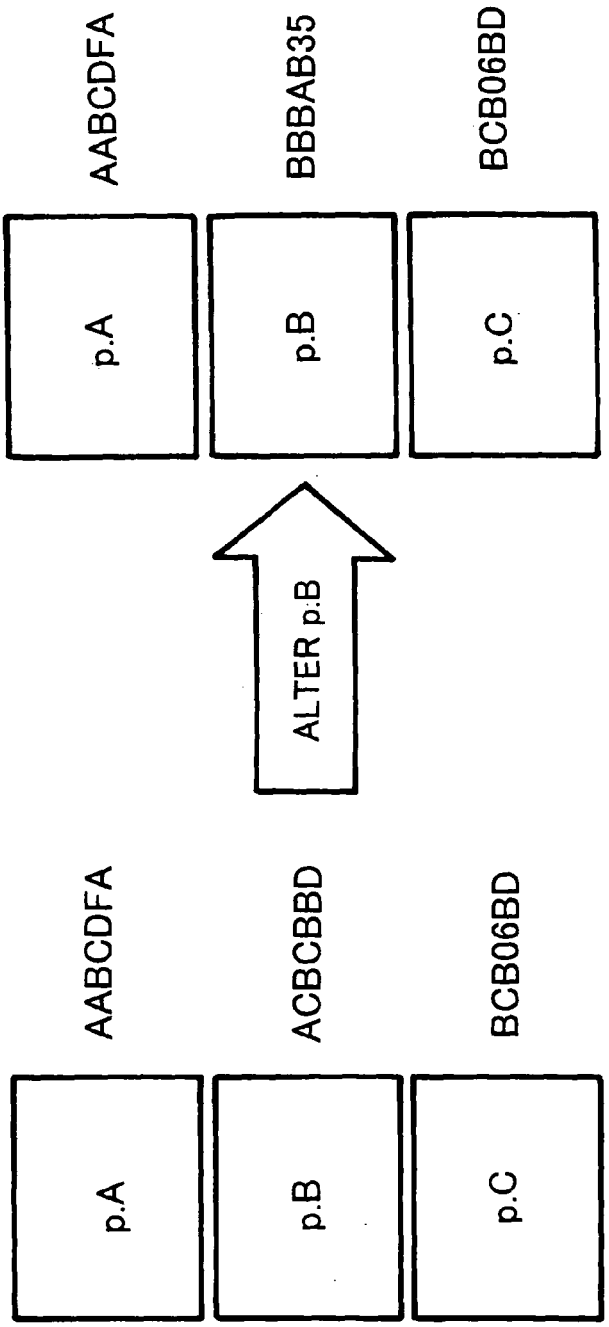

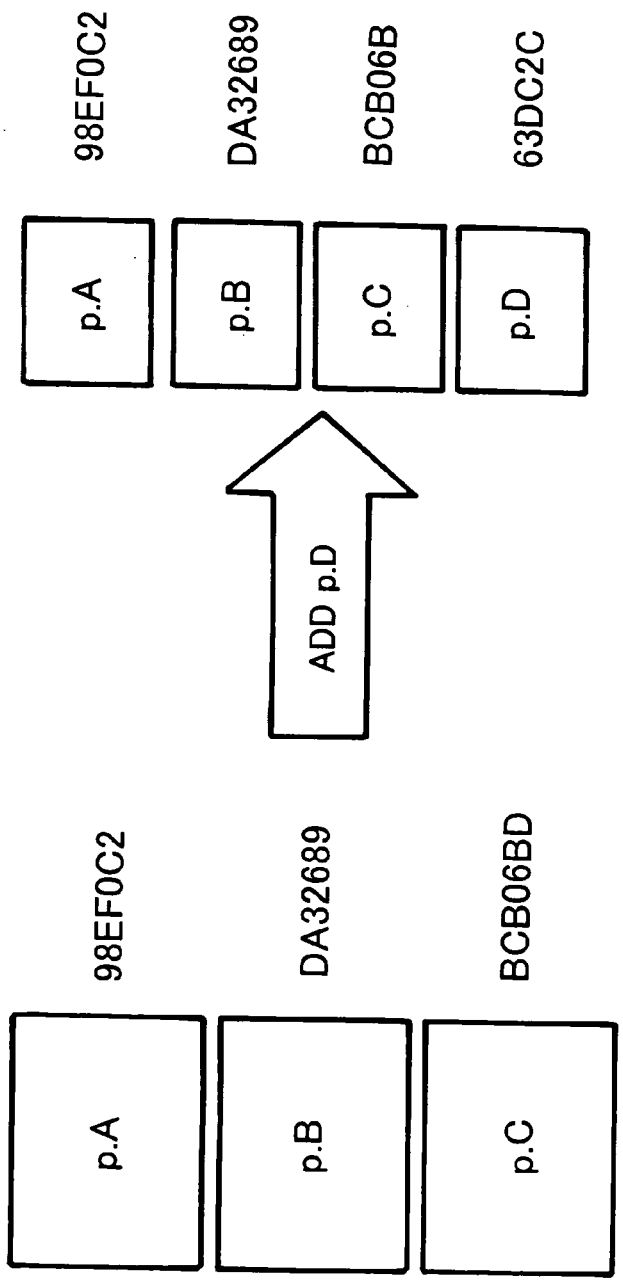

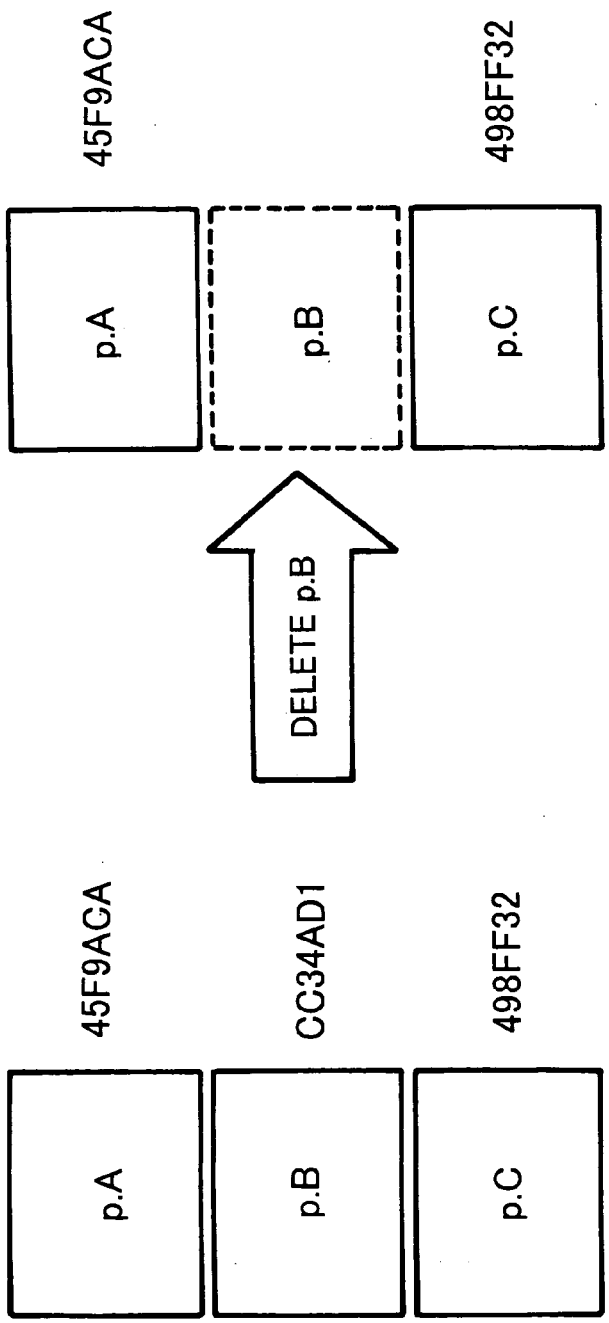

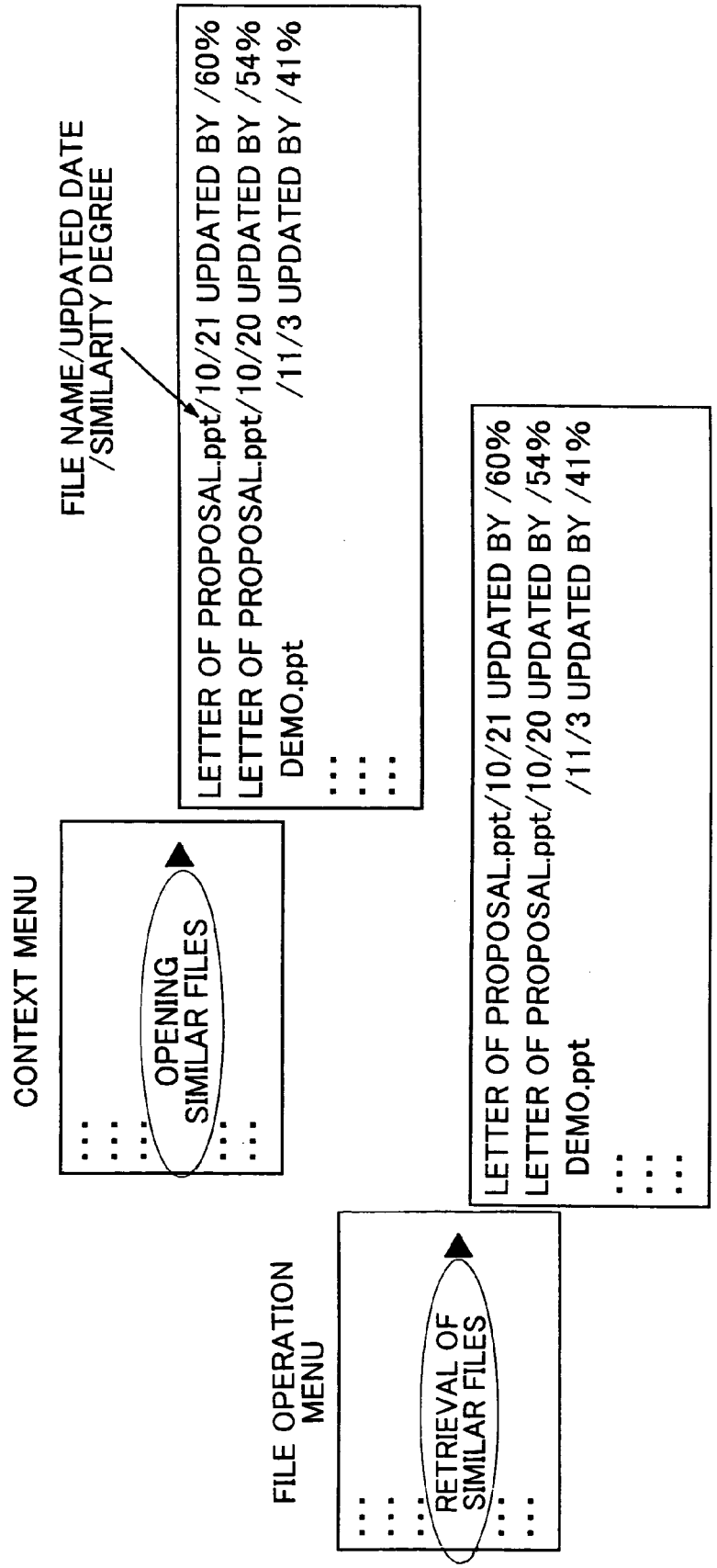

SIMILAR FILES MANAGEMENT APPARATUS AND METHOD AND PROGRAM THEREFOR

This application is based upon and claims the benefit of priority from Japanese patent application No. 2007-098386, filed on Apr. 4, 2007, the disclosure of which is incorporated herein in its entirety by reference.

BACKGROUND OF THE INVENTION

1. Field of the Invention

This invention relates to a similar files management apparatus for displaying the degrees of similarity of similar files that resemble a specified file and identification information on the similar files and also to a method and a program to be used for the same.

2. Description of the Related Art

Conventionally, document files are provided with file names, edition numbers and dates for the purpose of managing the edition numbers of the files. Document edition number management systems normally employ information that is not related to the contents of the file such as information on the edition number, the updated date and the person who updated. Patent Document 1 (JP-A 2003-186714) and Patent Document 2 (JP-A 2006-268447) describe examples of known document edition number management systems.

Patent Document 3 (JP-A 2006-185167) describes a similar file retrieval system for detecting similarities of files on the basis of access history and viewed time in addition to names of authors, titles and updated dates and Patent Document 4 (JP-A 2006-72881) describes a system for retrieving similar documents by vector space analysis based on access history.

Known file management systems include those that can retrieve relatively similar files by tracing file updating history, utilizing file management features such as groupware, but such systems are accompanied by a problem that they require cumbersome operations and hence are not being utilized effectively.

Additionally, such systems require the user to open and see files in order to check if there are similar files or not.

Still additionally, when there are very similar files such as a file of the edition immediately before a slight change and a file of the edition immediately after the slight change, the files need to be collated on a page by page basis.

SUMMARY OF THE INVENTION

Therefore, it is an object of the present invention to provide a similar files management apparatus that displays files similar to a specified file with the respective degrees of similarity and a method and a program to be used for the same.

According to the present invention, the above object is achieved by providing a similar files management apparatus including: a unit specific information generator for acquiring information specific to each unit contained in a file by means of a predetermined computation formula from the contents of the unit; a file similarity degree computer for computing the similarity degree between files by comparing the pieces of information specific to the respective units on a unit by unit basis; and a display for displaying the similarity degree of each file other than a specified file relative to the specified file and file identification information of the each file.

In addition, according to the present invention, there is provided a similar files management method comprising: acquiring information specific to each unit contained in a file by means of a predetermined computation formula from the contents of the unit; computing the similarity degree between files by comparing the pieces of information specific to the respective units on a unit by unit basis; and displaying the similarity degree of each file other than a specified file relative to the specified file and file identification information of the each file.

Further, according to the present invention, there is provided a computer program product embodied on a computer-readable medium and comprising codes that, when executed, cause a computer to perform a similar files management method comprising: acquiring information specific to each unit contained in a file by means of a predetermined computation formula from the contents of the unit; computing the similarity degree between files by comparing the pieces of information specific to the respective units on a unit by unit basis; and displaying the similarity degree of each file other than a specified file relative to the specified file and file identification information of the each file.

BRIEF DESCRIPTION OF THE DRAWINGS

FIG. 2 is a schematic illustration of file identification information that can be used for the embodiment of the invention;

FIG. 3 is a sequence chart of an operation of the embodiment of similar files management apparatus of FIG. 1 when storing a file;

FIG. 4 is a sequence chart of an operation of the embodiment of similar files management apparatus of FIG. 1 when retrieving a file;

FIG. 5 is a schematic illustration of exemplar representative value information generated by the embodiment of similar files management apparatus of FIG. 1 (when a page is altered);

FIG. 6 is a schematic illustration of exemplar representative value information generated by the embodiment of similar files management apparatus of FIG. 1 (when a page is added);

FIG. 7 is a schematic illustration of exemplar representative value information generated by the embodiment of similar files management apparatus of FIG. 1 (when a page is deleted); and FIG. 8 is a schematic illustration of an exemplar screen displayed by the embodiment of similar files management apparatus of FIG. 1.

DETAILED DESCRIPTION OF THE PREFERRED EMBODIMENTS

Figure 1:
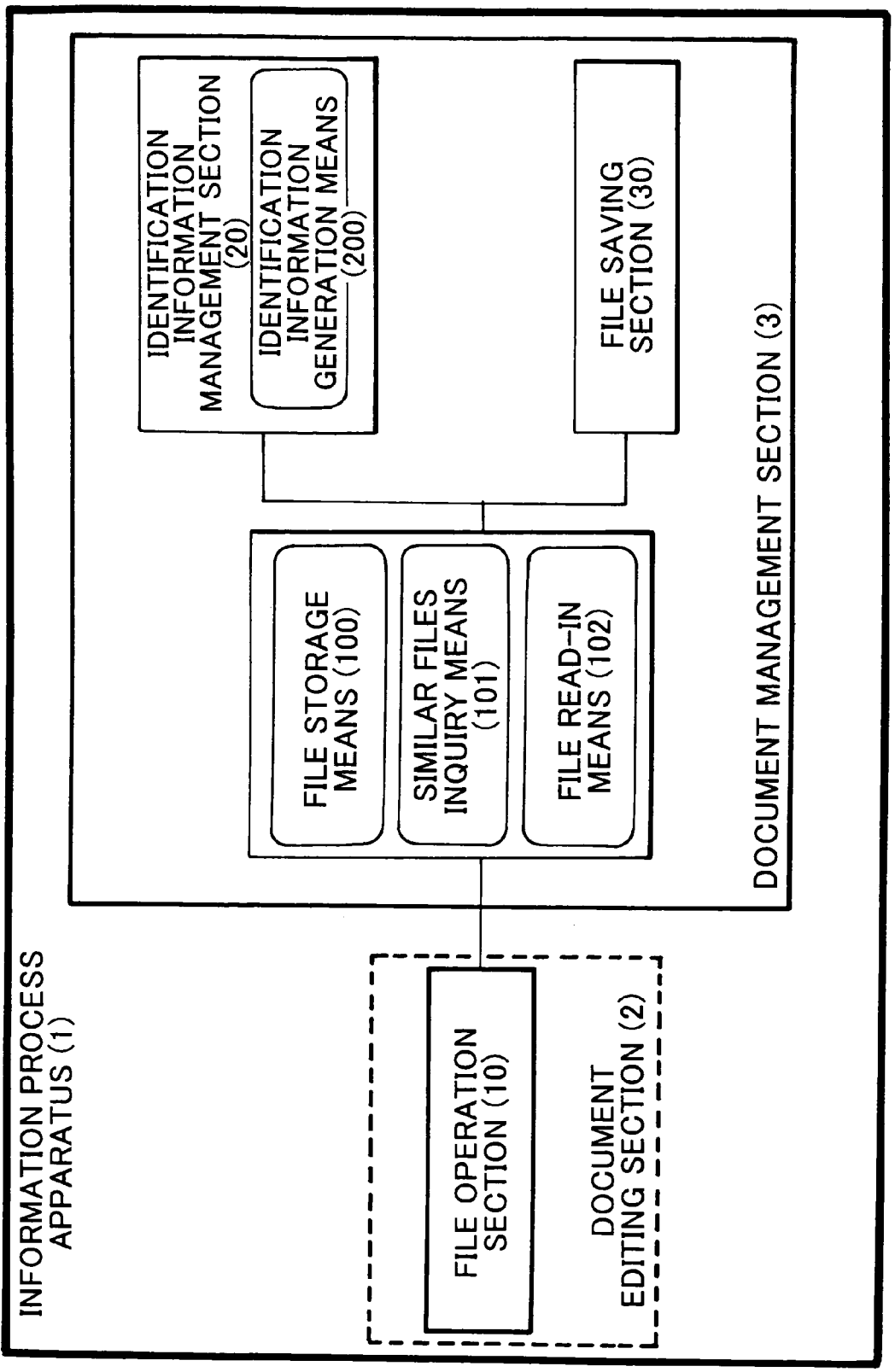
FIG. 1 is a schematic block diagram of an embodiment of similar files management apparatus according to the present invention.

Now, a preferred embodiment of the present invention will be described in greater detail by referring to the accompanying drawings.

Referring to FIG. 1, the embodiment of similar files management apparatus is formed on an information processing apparatus 1 and comprises a document editing section 2 and a document management section 3.

The document editing section 2 is adapted to operate on any of various applications (e.g., word processors, presentation programs and so on) and includes a file operation section 10. The document management section 3 is controlled by a program for operations and includes an identification information management section 20 and a file saving section 30. The document editing section 2 and the document management section 3 are connected to each other in the inside of the information processing apparatus 1.

The file operation section 10 has a functional feature of transmitting the files that are included in various applications operating on the information processing apparatus which may typically be a personal computer and operated (for preparation or updating) by any of the various applications, that of inquiring of the identification information management section 20 about similar files and that of calling the file to be read in from the file saving section 30.

The file operation section 10 includes a file storage means 100, a similar files inquiry means 101 and a file read-in means 102.

Each of these means operates in the following manner.

The file storage means 100 transmits a stored file to the identification information management section 20 and the file saving section 30. The file saving section 30 receives the stored file, saves it and subsequently notifies the identification information management section 20 of the file saving location. The identification information management section 20 receives the file saving location and updates and saves the related file identification information.

The similar files inquiry means 101 transmits a file to be compared to the identification information management section 20 in order to make the identification information management section 20 present files showing a high similarity degree relative to the file. The identification information management section 20 compares the file identification information of each of the files it stores that are different from the file and retrieves similar files. The identification information management section 20 presents information on the files that show a high similarity degree and are presented as a result of the retrieval to the file operation section 10.

The file read-in means 102 notifies the file saving section 30 of requested files out of the files presented by the similar files inquiry means 101. The file saving section 30 transmits the requested files to the file operation section 10.

The identification information management section 20 is a program that operates in the information processing apparatus which may typically be a personal computer. The identification information management section 20 has a functional feature of generating file identification information as shown in FIG. 2 from the files transmitted by the file operation section 10 and manages the information. The file identification information is unique identification information with which the contents of a file can be compared with the contents of other files and that is utilized to identify the file. The file identification information is generated with the results of computation of the representative value for each page of the stored file, the document ID, the updater ID and so on. Conceivable methods for computing the representative value include one that utilizes the outcome of acquiring an image of each page by way of a printer driver. The representative value may be a hash value, a sum check value or a CRC value, for example, from a computed representative value from an image of each page. FIGS. 5 through 7 schematically illustrate methods of computing a representative value for each page.

The identification information management section 20 has an identification information generation means 200.

The identification information generation means 200 generates file identification information from the stored file transmitted from the file storage means 100 and saves the information. It also generates file identification information from the file to be compared transmitted from the similar files inquiry means 101.

The file saving section 30 is a section saving the data to be secured in the information processing apparatus which may typically be a personal computer and has a functional feature of saving the files that the file operation section 10 utilizes and transmits files in response to a request from the file operation section 10.

Now, the operation of the embodiment of the invention will be described in detail by referring to the sequence charts of FIGS. 3 and 4, the exemplar operations illustrated in FIGS. 5 through 7 and the image in FIG. 8.

Firstly, referring to FIG. 3, when the file operation section 10 stores a file, it transmits the file to be stored to the identification information management section 20 and the file saving section 30 (Step A1). Then, the identification information management section 20 prepares file identification information of the file to be stored. The file saving section 30 saves the file to be stored and notifies the identification information management section 20 of the file saving location (Step A2). The identification information management section 20 adds the information on the file saving location it is notified of, to the file identification information.

Examples of alteration of file identification information will be described below. FIG. 5 shows that page B of a 3-page file (Document ID 002279) is edited and altered. Then, the representative value of page B in representative value information is also altered at the time when file identification information is generated (e.g.: ACBCBBD→BBBAB35). As a result, the similarity ratio of the document before and after the alteration becomes $2/3=66.7\%$. FIG. 6 shows that page D is added to a 3-page file (Document ID 003288) and representative value of page D is added to the representative value information at the time when file identification information is generated. As a result, the similarity ratio of the document before and after the alteration becomes $3/4=75.0\%$. FIG. 7 shows that page B is deleted from a 3-page file (Document ID 004322) from a 3-page file and representative value of page B is deleted from the representative value information at the time when file identification information is generated. As a result, the similarity ratio of the document before and after the alteration becomes equal to $2/3=66.7\%$.

Now, referring to FIG. 4, as the file operation section 10 transmits the file for which the existence or non-existence of similar files need to be checked as file to be compared to the identification information management section 20 (Step B1), the identification information management section 20 prepares file identification information of the file to be compared (Step B2). Then, the identification information management section 20 retrieves similar files according to the file identification information of the file to be compared (Step B3) and notifies the file operation section 10 of the files having a high similarity degree as a list showing the similarity ratios and the updated dates of the files (Step B4). As the file operation section 10 specifies and requests the files to be read by means of the list it is notified of (Step B5), the file saving section 30 transmits the files to the file operation section 10 (Step B6).

The above operation can be executed from a file operation menu of the application while editing a file as shown in FIG. 8 or from a context menu while operating a file.

Now, the advantages of this embodiment will be described below.

The first advantage is that similar files can be retrieved without spending much time. The reason for this is that file identification information is automatically generated and managed when storing a file.

The second advantage is that the degrees of similarity of files can be grasped without opening the files. The reason for this is that degrees of similarities are computed from file identification information and displayed.

The third advantage is that the differences between very similar files can be detected. The reason for this is that a representative value is generated for each page and used for comparisons.

While the degree of similarity of pages is determined by determining a hash value for each of the pages and each page is compared by using the hash value in the above-described embodiment, a chapter, a section or a paragraph may be used as a unit instead of a page. To recognize a chapter, a section or a paragraph, it is only necessary to check rank information, a tree structure, chapter numbers or section numbers of a document in the stage of character codes before producing a printed image.

Thus, according to the embodiment of the present invention, the similarity degree between files can be grasped as a numerical value.

Since similar files can be detected according to the present invention, the present invention can find applications of dividing a file into pages and managing parts for preparing data. Capabilities for updating similar files and analyzing the access status can encourage people having similar job assignments and interests to share information.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A similar files management apparatus, comprising:
a unit specific information generator for acquiring information specific to each unit contained in a file by a predetermined computation formula from contents of the unit;
a file similarity degree computer for computing a similarity degree between files by comparing pieces of information specific to respective units on a unit by unit basis; and
a display for displaying the similarity degree of each file other than a specified file relative to the specified file and the file identification information of the each file,
wherein the unit comprises a page,
wherein the information specific to each unit comprises one of a hash value, a sum check value, and a CRC value,
wherein, when numbers of pages in two files to be compared are equivalent, the file similarity degree computer derives the similarity degree from dividing a number of pages having equivalent pieces of information specific thereto by a total number of pages in the two files, and
wherein, when the numbers of pages in two files to be compared are different from each other, the similarity degree computer derives the similarity degree from dividing the number of pages having equivalent pieces of information specific thereto by a total numbers of pages of a file having a larger number of pages.

2. The apparatus according to claim 1, further comprising an identification information management section configured to generate file identification information for the files.

3. The apparatus according to claim 2, wherein the file identification information comprises unique identification information with which the contents of the file can be compared with the contents of other files to identify the file.

4. The apparatus according to claim 2, wherein file identification information is generated with results of the predetermined computation formula.

5. A computer program product tangibly embodied on a computer-readable medium and comprising codes that, when executed, cause a computer to perform a similar management method, said method comprising:
acquiring information specific to each unit contained in a file by a predetermined computation formula from contents of the unit;
computing a similarity degree between files by comparing pieces of information specific to respective units on a unit by unit basis; and
displaying the similarity of degree of each file other than a specified file relative to the specified file and file identification information of the each file,
wherein the unit comprises a page,
wherein the information specific to each unit comprises one of a hash value, a sum check value, or a CRC value,
wherein, when numbers of pages in two files to be compared are equivalent, the similarity degree is derived from dividing a number of pages having equivalent pieces of information specific thereto by a total number of pages in the file, and
wherein, when the numbers of pages in two files to be compared are different from each other, the similarity degree is derived from dividing the number of pages having equivalent pieces of information specific thereto by a total number of pages of a file having a larger number of pages.

* * * * *